No. 868,175. PATENTED OCT. 15, 1907.
H. C. FINLEY.
OIL BURNER.
APPLICATION FILED JUNE 7, 1906.
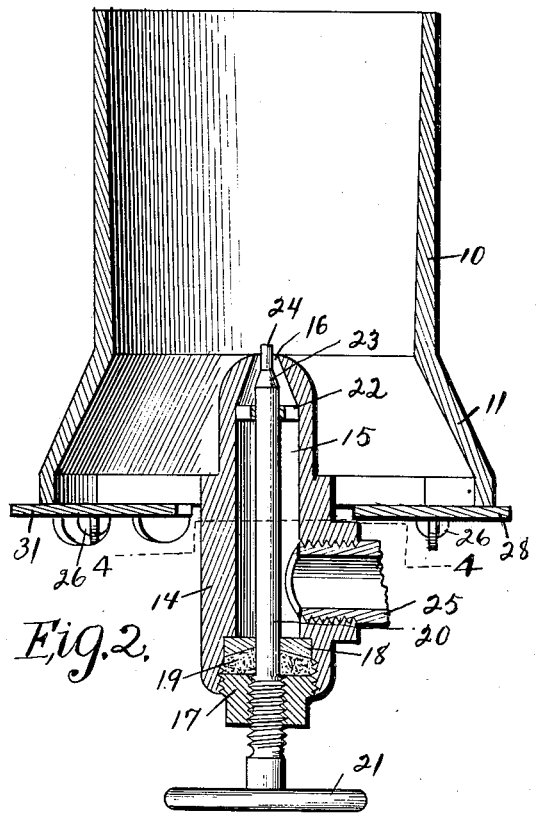
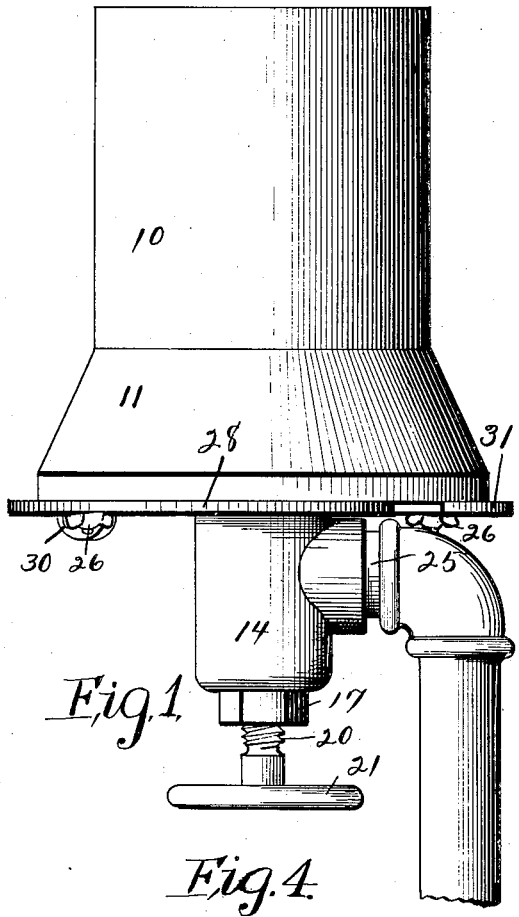
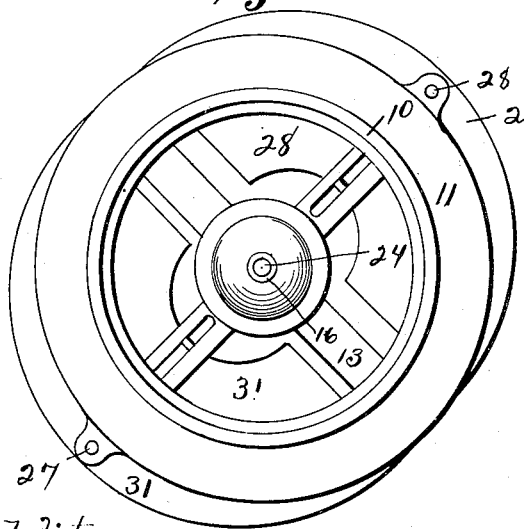
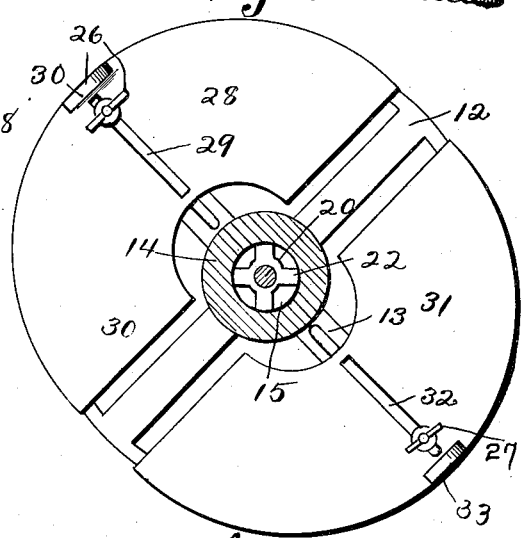
Witnesses
A. G. Hague
H. K. Keffer
Inventor H. C. Finley
by Orwig & Lane attys

UNITED STATES PATENT OFFICE.

HERSCHEL C. FINLEY, OF CHERRYVALE, KANSAS.

OIL-BURNER.

No. 868,175.　　　Specification of Letters Patent.　　　Patented Oct. 15, 1907.

Application filed June 7, 1906. Serial No. 321,042.

*To all whom it may concern:*

Be it known that I, HERSCHEL C. FINLEY, a citizen of the United States, residing at Cherryvale, in the county of Montgomery and State of Kansas, have invented a certain new and useful Oil-Burner, of which the following is a specification.

The objects of my invention are to provide an oil burner for heating and other purposes of simple, durable and inexpensive construction, in which the flow of oil into the combustion chamber and the flow of air into the same can be controlled by mechanism provided for the purpose.

With these objects in view, my invention consists in certain details, in the construction, arrangement and combination of the various parts of the device, whereby the objects contemplated are attained, as hereinafter more fully set forth, pointed out in my claim and illustrated in the accompanying drawings, in which—

Figure 1 is a side elevation of the burner. Fig. 2 is a vertical, sectional view of the same, Fig. 3 is a plan view of the burner, and Fig. 4 is a sectional view cut on the line 4—4 of Fig. 2.

Referring to the accompanying drawings, it will be seen that I have provided a cylindrical combustion chamber 10, having the enlarged lower portion 11 therein. Secured to the lower edge of the enlarged lower portion 11 of the combustion cylinder 10 are the burner supports 12 and 13, to which the hollow cylindrical body portion 14 of the burner is detachably secured. On the interior of the hollow body portion 14 is the oil chamber 15 which diminishes in size to form a comparatively small outlet 16, through which the oil is designed to pass. In the lower portion of the cylindrical body 14 we have provided a nut 17, designed to be screwed into the lower end of said body portion. A slight distance above the nut 17 is a cap 18. Between the cap 18 and the nut 17 I have provided a packing 19 designed to prevent the leaking of the oil from the chamber 15.

Passing through the cap 18 and the packing 19, and screwed into the central portion of the nut 17 is an adjustable screw valve 20 having a small wheel 21 at its lower end by which it can be operated, adjacent to the upper end of which I have provided a guide 22 through which the screw valve passes. Near the upper end of the screw valve I have provided a tapered portion 23, and immediately above this tapered portion, a mixer pin 24, which mixer pin is designed to pass through the outlet 16 and to have the oil pass around it as it is forced through the outlet. The tapered portion 23 is designed to entirely close the outlet when forced into it by closing the screw valve.

By regulating the screw valve and through it the mixer pin 24, the mixing of the oil is regulated. Leading into the chamber 15 is an oil supply pipe 25, through which the oil is forced by a suitable mechanism for creating sufficient pressure to provide an even flow of oil into the combustion chamber.

At diametrically opposite points on the rim of the enlarged portion 11 of the combustion chamber, I have provided screws 26 and 27, and on the screw 26 I have mounted the slide 28 which has a slot 29 in which is the screw 26. I have provided a handle 30 designed to move the slide 28 outwardly or inwardly on the screw 26. I have provided a similar plate 31 having the slot 32 in it in which is the screw 27, and I have also provided a handle 33 for operating the slide 31. By moving the slides toward or away from each other, the amount of air allowed to pass into the combustion chamber is diminished or increased so that by the use of my mechanism, absolute control is had over the admission of air and oil into the combustion chamber. In constructing this device, various materials may be used and the device may be varied somewhat to accomplish the desired results.

In practice, this burner can be used to advantage in brick kilns, and it can also be used to advantage in connection with boilers, furnaces and other numerous devices in which burners are beneficial.

Having thus described my invention, what I claim and desire to secure by Letters Patent of the United States, therefor is—

In an oil burner, the combination of a combustion chamber open at its lower and upper ends, a burner comprising an oil chamber extending upward in the combustion chamber and below the lower end thereof and having an outlet at its upper end, and a screw valve bearing in the oil chamber and having a handle disposed below said chamber, supports carrying the oil chamber of the burner and fixed to the lower end of the combustion chamber, two horizontal slides arranged and movable immediately below the said supports and having recesses in their inner edges conforming in shape to and arranged to receive the burner and also having slots between the said recesses and their outer edges, and screws extending through said slots and connected with the combustion chamber at opposite points.

HERSCHEL C. FINLEY.

Witnesses:
H. H. AKERS,
C. R. LOGAN.